(12) United States Patent
Schmied et al.

(10) Patent No.: US 6,354,189 B1
(45) Date of Patent: Mar. 12, 2002

(54) PRESSURE MEDIUM SYSTEM, WORKING CYLINDER AND RETAINING CLAMP

(75) Inventors: Peter Schmied, Schongau; Gisela Schleich, Schwabbruck; Herbert Kainzmeier, Altenstadt; Gunther Schönfelder, Hohenfurch, all of (DE)

(73) Assignee: Hoerbiger Hydraulik GmbH, Schongan (DE)

( * ) Notice: Subject to any disclaimer, the term of this patent is extended or adjusted under 35 U.S.C. 154(b) by 0 days.

(21) Appl. No.: 09/544,112

(22) Filed: Apr. 6, 2000

(30) Foreign Application Priority Data

Apr. 7, 1999 (AT) ............................... 230/99 U

(51) Int. Cl.⁷ ................................. F01B 31/00
(52) U.S. Cl. ........................ 92/163; 285/305
(58) Field of Search ................. 91/432; 92/163; 285/305; 24/573.1

(56) References Cited

U.S. PATENT DOCUMENTS 3,881,753 A * 5/1975 Bochory ............... 285/305
4,333,505 A * 6/1982 Jones et al. ............ 285/305
5,112,085 A * 5/1992 Bush et al. ............ 285/305
5,904,221 A * 5/1999 Breitweg et al. ........ 285/305

FOREIGN PATENT DOCUMENTS

JP 4-191589 A * 7/1992 ............... 285/305

* cited by examiner

Primary Examiner—F. Daniel Lopez
(74) Attorney, Agent, or Firm—Dykema Gossett PLLC

(57) ABSTRACT

A pressure medium system, particularly a hydraulic system, which includes at least one working cylinder (pressure medium cylinder) and at least one pressure medium line for the supply and/or discharge of the pressure medium whereby assembly and disassembly is made possible, especially in vehicles, without great (manufacturing) efforts and by economic production by using a detachable retaining clamp (6) which grasps the outside of a pressure medium coupling (3) and an end piece (5) of the pressure medium line (4), which may be inserted into the pressure medium coupling (3).

4 Claims, 1 Drawing Sheet

PRESSURE MEDIUM SYSTEM, WORKING CYLINDER AND RETAINING CLAMP

BACKGROUND OF THE INVENTION

1. Field of the Invention

The invention relates to a pressure medium system, particularly a hydraulic system, that includes at least one working cylinder (pressure medium cylinder), and at least one pressure medium line for the supply and/or discharge of the pressure medium which may be joined via its end piece to the pressure medium coupling on the cylinder. It includes a working cylinder, particularly a hydraulic working cylinder, to be used in this type of pressure medium system, having at least one pressure medium coupling for the supply and/or discharge of the pressure medium for at least one working chamber of the cylinder, which is defined at one side by the piston.

2. The Prior Art

In current traditional systems, the hose for the supply and/or discharge of pressure medium, particularly in hydraulic actuation arrangements—as in the construction of vehicles—is rigidly joined to a connection by means of pressing whereby the connection is disposed on the cylinder itself or on the rear cover or the front cover. Detaching of this connection is therefore only possible by breaking the end of the hose or the connection itself. Should there be a defect in the connection line or the cylinder, then the complete cylinder/hose unit must therefore be replaced in all cases. Great costs are involved in cases of replacement, specifically in vehicles with their evermore complex components and designs, particularly the new tops for convertibles or the trunk lids or the like. For example, hoses are often times firmly glued to the convertible top material so that in case of replacement, complete dismantling of the convertible top is necessary.

It was the object of the present invention to provide a system or a cylinder for use in a system of this type whereby assembly and disassembly is made possible, especially in vehicles, without great (manufacturing) efforts and by way of economic production.

SUMMARY OF THE INVENTION

To achieve this object, a detachable retaining clamp is employed to grasp the outside of the pressure medium coupling and the end piece of the pressure medium line is inserted into the pressure medium coupling. Thereby simple assembly and a disassembly is guaranteed without additional efforts even in an installed state, as when installed in vehicles. Components may be installed and/or replaced hereby into the complete system independent from one another, at different times, or by different manufacturers, for actuation by this system or to be used only as pre-manufactured spare parts for this system. The complete system may be manufactured in a simpler manner and with low requirements in view of additional apparatuses and costs by avoiding the use of pressing devices.

To achieve the determined object, a working cylinder is characterized in that the pressure medium coupling is joined to the working cylinder by stud welding and wherein the coupling is provided with an annular groove which cooperates with the retaining clamp. In addition to the previously mentioned advantages, this type of design allows a reduction in overall height and a simple attachment of the pressure medium coupling, independent from its location.

A simple configuration, with a very good and secure holding effect, may be achieved by the use of a retaining clamp for a system of this type which, according to an additional innovative characteristic, is provided with two essentially parallel side pieces that have protrusions to engage the annular grooves and which are connected to one another with an angled connecting piece. A top segment that protrudes from the angled connecting piece is provided with a slot to receive the end piece of the pressure medium line and with two lateral brackets. The brackets extend through oblong openings or slots in the side parts of the retaining clamp.

The invention will be better understood by reference to the attached drawings taken in conjunction with the following discussion.

DETAILED DESCRIPTION OF THE PREFERRED EMBODIMENT

Figure 1:
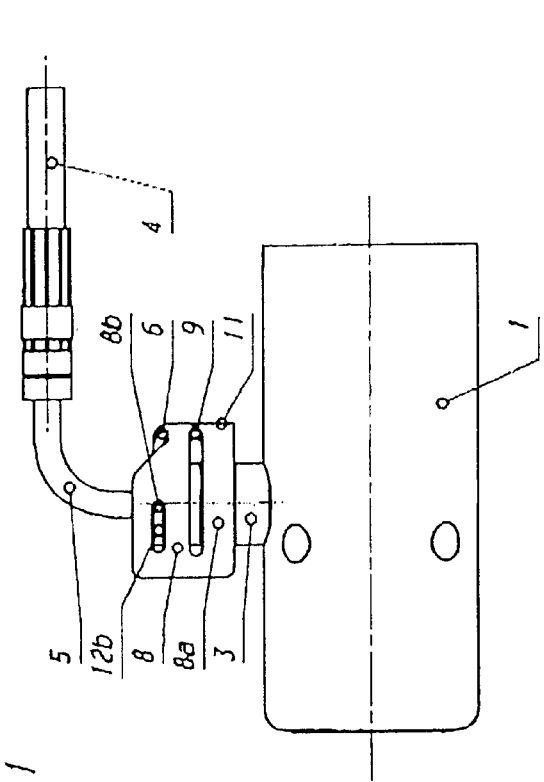
FIG. 1 shows a side view of an end piece of an innovative working cylinder having a detachably connected pressure medium line according to the present invention.
Figure 3:
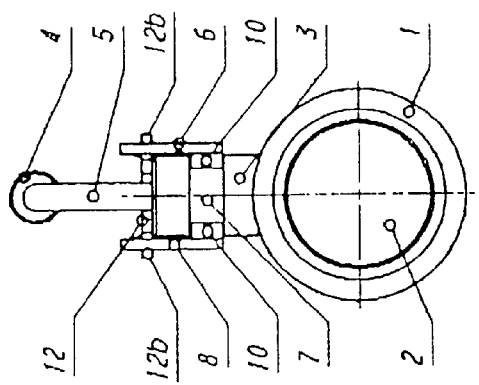
FIG. 3 shows a front view along an axial direction.
Figure 2:
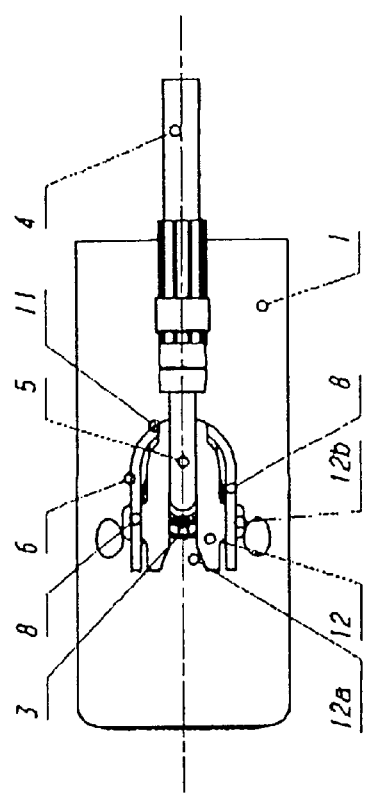
FIG. 2 shows a top view of the end piece in FIG. 1.
Figure 4:
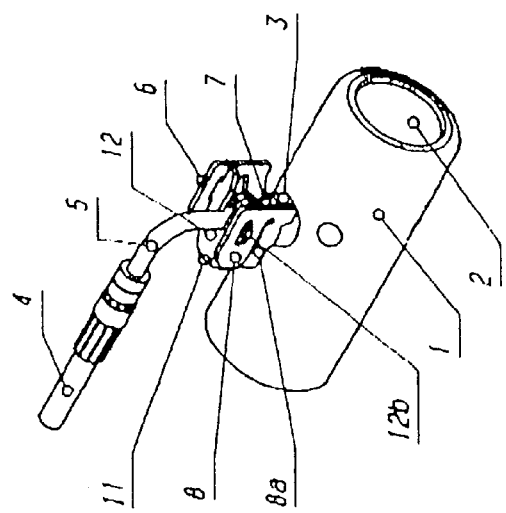
FIG. 4 depicts a perspective view of the end piece.

On a cylinder barrel 1, for example one with an integrated rear cover 2 and/or front cover, there is disposed a pressure medium coupling 3 for the supply and/or discharge of the pressure medium, particularly hydraulic oil, whereby the coupling is attached separately onto the cylinder barrel by stud welding. The stud welding process, which is in the order of arc pressure welding according to DIN-Norm (standard), is utilized currently by itself as a modem fastening or joining technology in the entire metal working industry in the most various combinations. Depending on the type of application and requirements, different processing versions are employed whereby at least arc pressure welding with stroke ignition is used. It generally concerns a simple and precise operating process, with which one can work in a very cost-effective manner. The cylinder barrel 1 does not have to be machined prior to the fastening of the pressure medium coupling 3 other than removing burrs or the like. One version of the manufacturing process has been proven to be of advantage whereby the mounted parts of the pressure medium coupling 3 are at this point without bores before assembly, as is the cylinder barrel 1. They are provided with a connecting boring leading through the cylinder barrel only after the welding process. This connecting boring may be produced either without cutting (for example by pressing or punching) or by means of traditional cutting technologies (boring, milling or the like).

A pressure medium line 4 is preferably provided with an essentially 90° angled end piece 5, whereby the end piece 5 may be inserted into a boring in the pressure medium coupling 3 and fixed therein by means of a retaining clamp 6. Thereby there is guaranteed by the preferably rotation-symmetrical design of the boring in the pressure medium coupling 3 and the end piece 5 that the pressure medium line 4 may be attached to the pressure medium cylinder 1 in any direction and whereby it may be turned even later on. The end piece 5 is preferably designed to be flexible so that the angle may be freely adjusted between the axis of the pressure medium cylinder 1 and the front piece of the pressure medium line 4, which is behind the end piece 5.

On the outer and essentially cylindrical casing surface of the pressure medium coupling 3 there is provided an annular groove 7, which is created there to cooperate with the retaining clamp 6. This retaining clamp 6 has in its illustrated, advantageous embodiment two essentially parallel sides pieces (members) 8 in which there is disposed an oblong opening 9 or a slot in a longitudinal direction of the side pieces 8 whereby the oblong opening or slot divides the side pieces into an upper strip and a lower strip 8a. Both strips 8a are provided with extrusions, for example projections or protrusions 10, which engage the annular groove 7, or whereby the strips are designed in such a manner that it is impossible to pull of the retaining clamp 6 in axial direction from the pressure medium coupling 3. The opening and closing of the retaining clamp 6 around the pressure medium coupling is feasible by suitable dimensioning and shaping of the protrusion 10.

The two side pieces 8 are joined with one another by an angled connection piece (member) 11 whereby a tip segment 12 protrudes from the connecting piece 11 and whereby the top segment is provided with a slot (elongated opening) 12a in which the end piece 5 of at the pressure medium line comes to rest. The slot 12a is designed in such a manner that a preferably annular projection of the end piece 5 is kept securely below the top segment 12 and whereby the end piece 5 is fixed in an inserted position in the pressure medium coupling 3. To prevent possible bending of the top segment 12 in an upward direction by applying force, as in pulling the end piece 5 from the pressure medium coupling 3, the top piece 12 is provided with two lateral brackets 12b, which extend through the oblong openings or slots 8b in the side pieces 8 of the retaining clamp 6 whereby the slots are disposed preferably at the upper strip. Furthermore, the retaining clamp 6 may thereby be mounted or detached without the use of a special tool.

We claim:

1. A retaining clamp for use in connecting a pressure medium line to a coupling, said retaining clamp comprising:

first and second generally parallel side members and a connecting member extending therebetween, said first and second side members being positionable around said coupling and including protrusions on inner sides thereof which respectively connect to said coupling and including parallel slots, and a top member which extends from said connecting member between said first and second side members and including opposite edges having brackets which respectively extend into said slots, said top member defining an elongated opening, wherein the pressure medium line is positionable in the elongated opening.

2. A combination of a working cylinder having a coupling, a pressure medium line, and a retaining clamp for connecting the pressure medium line to the coupling, said retaining clamp comprising:

first and second generally parallel side members and a connecting member extending therebetween, said first and second side members being positionable around said coupling and including protrusions on inner sides thereof which respectively connect to said coupling and including parallel slots, and a top member which extends from said connecting member between said first and second side members and including opposite edges having brackets which respectively extend into said slots, said top member defining an elongated opening, wherein the pressure medium line is positionable in the elongated opening.

3. A combination according to claim 2, wherein said coupling is stud welded to said working cylinder, and wherein said coupling includes an annular groove therearound.

4. A combination according to claim 3, wherein said protrusions extend into said annular groove.

* * * * *